(12) United States Patent
Jafari et al.

(10) Patent No.: US 11,448,103 B2
(45) Date of Patent: Sep. 20, 2022

(54) ELECTROMAGNETIC SOFT ACTUATORS

(71) Applicant: Board of Regents, The University of Texas System, Austin, TX (US)

(72) Inventors: Amir Jafari, San Antonio, TX (US); Nafiseh Ebrahimi, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 184 days.

(21) Appl. No.: 16/457,452

(22) Filed: Jun. 28, 2019

(65) Prior Publication Data

US 2020/0003088 A1    Jan. 2, 2020

Related U.S. Application Data

(60) Provisional application No. 62/691,314, filed on Jun. 28, 2018.

(51) Int. Cl.
*H01F 7/00* (2006.01)
*F01L 9/20* (2021.01)
(Continued)

(52) U.S. Cl.
CPC ............ *F01L 9/20* (2021.01); *F02D 41/20* (2013.01); *F16K 31/06* (2013.01); *H01F 7/081* (2013.01); *H01F 7/16* (2013.01); *F01L 2009/2109* (2021.01); *F01L 2009/2136* (2021.01); *F01L 2009/2148* (2021.01); *H01F 2007/1692* (2013.01)

(58) Field of Classification Search
CPC . F16K 31/06; H01F 7/081; H01F 7/16; H01F 2007/1692; H01F 7/1615; F02D 41/20; F01L 2009/2109; F01L 2009/2136; F01L 2009/2148; F01L 1/3442
USPC ........................................ 335/229
See application file for complete search history.

(56) References Cited

U.S. PATENT DOCUMENTS 3,119,940 A * 1/1964 Pettit ..................... H01F 7/1615
310/24
5,365,210 A * 11/1994 Hines ..................... H01F 7/1615
335/173
(Continued)

OTHER PUBLICATIONS

Wearable Therapy Technology http://www.axiobionics.com/wearable-therapy-technology/.
(Continued)

*Primary Examiner* — Shawki S Ismail
*Assistant Examiner* — Lisa N Homza
(74) *Attorney, Agent, or Firm* — Thomas | Horstemeyer, LLP

(57) ABSTRACT

In one embodiment, an electromagnetic soft actuator includes a first soft outer member comprising a soft internal electrically conductive coil, a second soft outer member comprising a soft internal electrically conductive coil, and a soft inner shaft on which the first and second soft outer members are mounted, the first and second soft outer members being linearly displaceable along a length of the soft inner shaft, the soft inner shaft comprising a permanent magnet, wherein the first and second outer members linearly move under an electromagnetic force relative to the soft inner shaft and each other when an electric current is applied to the soft internal electrically conductive coils.

20 Claims, 5 Drawing Sheets

(51) Int. Cl.

| | | |
|---|---|---|
| *F16K 31/06* | (2006.01) | |
| *H01F 7/08* | (2006.01) | |
| *H01F 7/16* | (2006.01) | |
| *F02D 41/20* | (2006.01) | |
| *F01L 9/21* | (2021.01) | |

(56) References Cited

U.S. PATENT DOCUMENTS

| | | | | |
|---|---|---|---|---|
| 6,507,257 | B2* | 1/2003 | Mohler | H01F 7/14 |
| | | | | 310/36 |
| 6,967,550 | B2* | 11/2005 | Elendt | H01F 7/1615 |
| | | | | 335/229 |
| 7,196,602 | B2* | 3/2007 | Adams | H01F 5/02 |
| | | | | 335/229 |
| 7,352,268 | B2* | 4/2008 | Wright | H01F 7/0242 |
| | | | | 335/229 |
| 8,072,302 | B2* | 12/2011 | Liang | H02N 2/023 |
| | | | | 335/229 |
| 8,176,887 | B2* | 5/2012 | Golz | F01L 13/0036 |
| | | | | 123/90.48 |
| 8,237,527 | B2* | 8/2012 | An | H01F 7/066 |
| | | | | 335/229 |
| 8,338,993 | B2* | 12/2012 | Kaneto | H01L 41/12 |
| | | | | 310/26 |
| 8,493,166 | B2* | 7/2013 | Golz | H01F 7/126 |
| | | | | 335/264 |
| 8,710,945 | B2* | 4/2014 | Wygnanski | H01F 7/1646 |
| | | | | 335/229 |
| 2003/0197582 | A1* | 10/2003 | Gruson | H01F 7/1615 |
| | | | | 335/229 |
| 2005/0052265 | A1* | 3/2005 | Vladimirescu | H01H 51/2209 |
| | | | | 335/229 |
| 2006/0118494 | A1* | 6/2006 | Rundt | B03C 1/286 |
| | | | | 210/695 |
| 2006/0145798 | A1* | 7/2006 | Kawamoto | H02K 1/14 |
| | | | | 335/229 |
| 2007/0018765 | A1* | 1/2007 | Takeuchi | H01F 7/1615 |
| | | | | 335/229 |
| 2008/0240942 | A1* | 10/2008 | Heinrich | F04B 43/04 |
| | | | | 417/322 |
| 2011/0001591 | A1* | 1/2011 | Puth | H01F 7/1615 |
| | | | | 335/229 |
| 2012/0091832 | A1* | 4/2012 | Soderberg | H01F 1/08 |
| | | | | 310/44 |
| 2012/0206226 | A1* | 8/2012 | Lee | H01F 7/1646 |
| | | | | 335/229 |
| 2012/0293287 | A1* | 11/2012 | Lauraire | H01H 3/28 |
| | | | | 335/229 |

OTHER PUBLICATIONS

Soft robotics at Harvard: https://softroboticstoolkit.com/.

Crevier, et al., "Artificial exomuscle investigations for applications—metal hydride" published in Biomedial Materials, vol. 2, No. 1, 2007.

* cited by examiner

ELECTROMAGNETIC SOFT ACTUATORS

CROSS-REFERENCE TO RELATED APPLICATION

This application claims priority to U.S. Provisional Application Ser. No. 62/691,314, filed Jun. 28, 2018, which is hereby incorporated by reference herein in its entirety.

BACKGROUND

Neurologically impaired people, such as stroke patients, often need assistance to move their joints. Such patients may be provided with a wearable rehabilitation and/or assistive device to provide such assistance. These devices typically take the form of passive devices, such as joint braces, or active devices, such as exoskeletons. While passive devices tend to be flexible and unobtrusive, they provide only limited assistance to the patient. While active devices can be powerful, and therefore can provide adequate assistance to the patient, they tend to be bulky and rigid and are not well suited for the human body.

Soft robotic systems are currently under rapid development and have the potential to change the status quo because they can easily deform to the human body and provide the power necessary to assist the patient. Unfortunately, the actuators of such systems tend to have their own drawbacks. For example, while actuators based on shape memory alloys exhibit high power-to-weight ratios, great mechanism simplicity, silent actuation, and low driving voltage, such actuators also exhibit highly nonlinear behavior, low energy efficiency, and slow response speed. The same holds true for other types of thermo-active soft actuators, such as polyethylene and nylon-based muscles. Pneumatic artificial muscles are another type of soft actuator that have been used in robotics due to their low weight and inherent compliant behavior. However, because their compliance comes from the compressibility of air, pneumatic artificial muscles require stationary power sources and accessories, such as air pumps and valves. Dielectric elastomer actuators are popularly referred to as "artificial muscles" because their actuation speed, low density, and silent operation emulate many of the desirable physical properties of muscles. Unfortunately, such actuators require high operating voltages, thereby preventing their operation with on-board batteries.

In view of the above discussion, it can be appreciated that it would be desirable to have soft actuators that are portable, adaptable to different joint sizes, and that can match the performance of mammalian skeletal muscles in terms of response time and output power-to-size ratio.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have soft actuators that are portable, adaptable to different joint sizes, and that can match the performance of mammalian skeletal muscles in terms of response time and output power-to-size ratio. Disclosed herein are examples of such soft actuators. More particularly, disclosed are electromagnetic soft actuators, which may be referred to as ESAs, that can be actuated by on-board batteries and produce linear forces that cause the actuators to contract in a similar manner to actin and myosin filaments inside a sarcomere (i.e., a human muscle actuation unit). In some embodiments, the actuators comprise solenoid-type electromagnetic soft actuators. In other embodiments, the actuators comprise voice coil motor-type electromagnetic soft actuators.

In the following disclosure, various specific embodiments are described. It is to be understood that those embodiments are example implementations of the disclosed inventions and that alternative embodiments are possible. All such embodiments are intended to fall within the scope of this disclosure. In addition, it is noted that hybrid embodiments that combine features of separate embodiments also fall within the scope of this disclosure.

As identified above, disclosed herein are electromagnetic soft actuators that can be actuated by on-board batteries to produce electromagnetic linear forces. As will be apparent from the discussion that follows, the electromagnetic soft actuators are highly scalable, which enables them to be miniaturized and assembled in parallel and series to create artificial sarcomeres. Furthermore, a series of artificial sarcomeres can be assembled to form soft "exofibers" that can be integrated (e.g., embedded) into an active joint brace. As the exofibers are activated based on the principle of electromagnetism, they can be quickly activated to generate force and motion. Preliminary results have confirmed that by scaling down the size of the electromagnetic soft actuators, the ratio between resulting force to cross-section area (F/CSA) of the electromagnetic soft actuator increases. In other words, the force generated by a unit volume of exofibers increases as the electromagnetic soft actuators decrease in size. This phenomenon translates into powerful mechanical performance of active joint braces that incorporate the electromagnetic soft actuators given that recent advanced manufacturing techniques are able to scale down the size of the actuators.

Figure 1A:
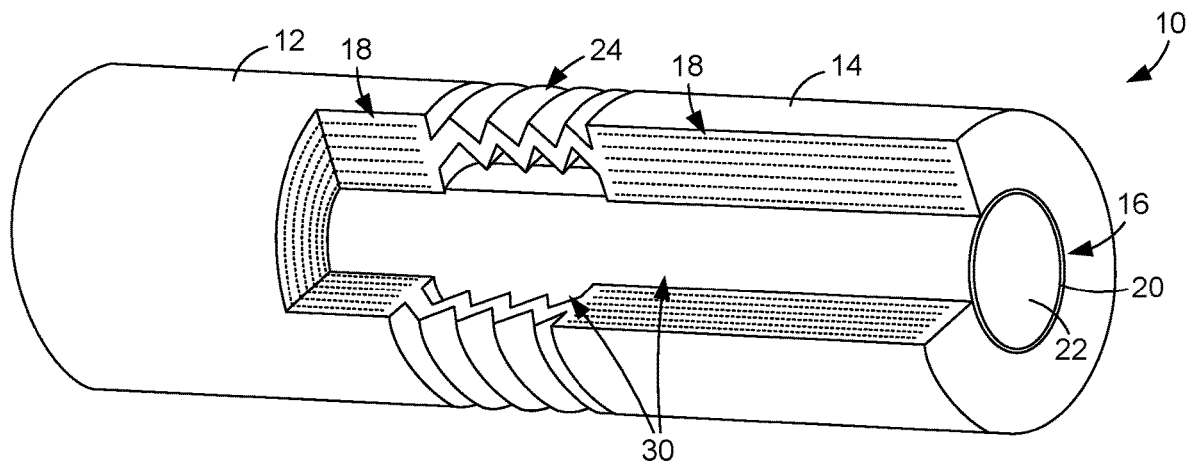
FIG. 1A is a perspective view of an embodiment of an electromagnetic soft actuator that can be used in artificial muscles to assist users in performing physical tasks.
Figure 1B:
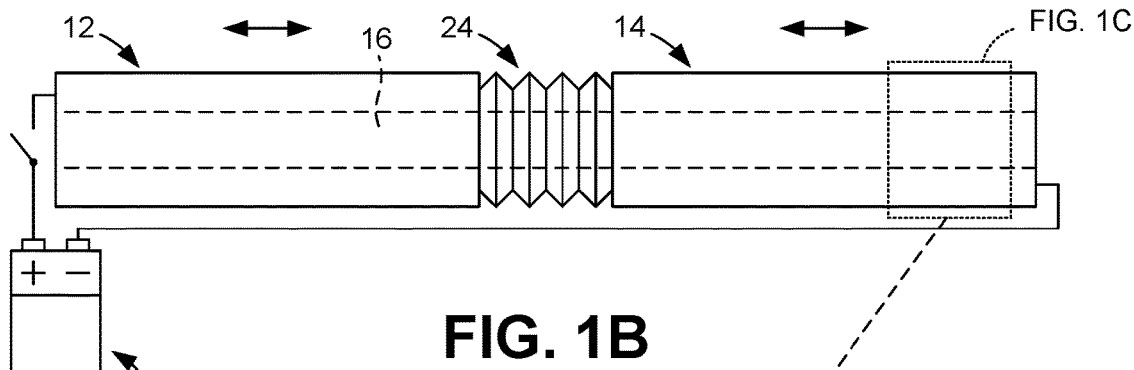
FIG. 1B is a schematic view of the electromagnetic soft actuator of FIG. 1A illustrating operation of the actuator in response to applied electric current.
Figure 1C:
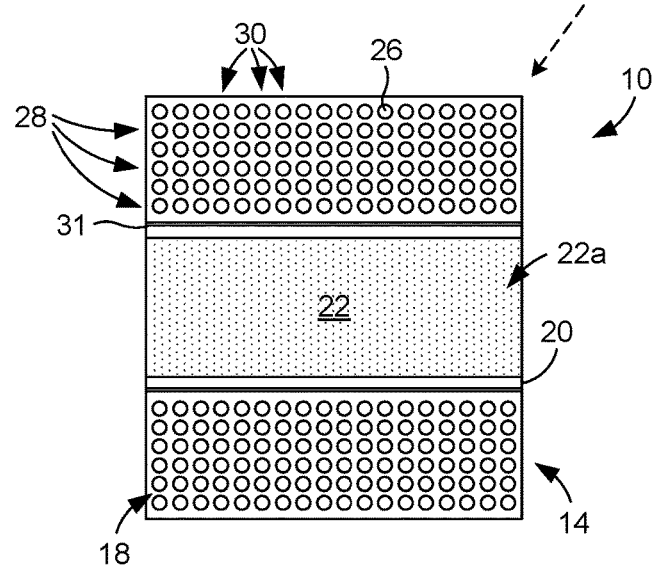
FIG. 1C is a detail view of a portion of the electromagnetic soft actuator shown in FIG. 1B illustrating a continuous microchannel or microtube of the actuator and a gap between an inner shaft and outer cylinders of the actuator.

FIGS. 1A-1C illustrate an embodiment of an electromagnetic soft actuator 10 that is based on the working principle of a solenoid. As shown in these figures, the electromagnetic soft actuator 10 generally comprises a first soft hollow outer cylinder 12 (first soft outer member) and a second soft hollow outer cylinder 14 (second soft outer member) that are each concentrically mounted on a soft inner shaft 16. Each of the cylinders 12, 14 is made of a soft, flexible polymeric material that comprises a ferromagnetic material. In some embodiments, the cylinders 12, 14 are each made of polydimethylsiloxane (PDMS) that is impregnated with ferromagnetic powder. By way of example, the resulting material has a weight ratio of PDMS to ferromagnetic powder of approximately 5:1. Notably, this ratio can be adjusted so as to tune the actuation of the electromagnetic soft actuator 10. In some embodiments, each outer cylinder 12, 14 has an outer cross-sectional diameter of approximately 10 to 12 mm and an inner cross-sectional diameter of approximately 9 to 11 mm, and the inner shaft 16 has an outer cross-sectional diameter of approximately 5 to 6 μm. Notably, while the figures show the outer cylinders 12, 14 and the inner shaft 16 as having circular cross-sections, it is noted that other configurations (e.g., elliptical, rectangular, etc.) may be viable. As used herein, the term "soft" means non-rigid, flexible, and capable of being easily deformed.

The outer cylinders 12, 14 each comprise a continuous soft internal electrically conductive coil 18. In some embodiments, each coil 18 comprises a single continuous helical microchannel formed within the cylinders 12, 14 during their fabrication (e.g., using an additive manufacturing process). FIG. 1C shows the microchannel 26 of the outer cylinder 14. This microchannel 26 forms a multilayer helix within the outer cylinder 14. As used herein, the term "multilayer helix" describes a configuration in which the object (the microchannel 26 in this context) forms multiple concentric helixes having different diameters. In such a structure, each concentric helix comprises one "layer" of the multilayer helix, with each layer being formed from multiple revolutions or "loops" of the same diameter that together form the concentric helical shape of the layer. The layers are identified in FIG. 1C with reference numeral 28 and the loops are identified in the figure with reference numeral 30. Once formed, each microchannel can be filled with an electrically conductive fluid, such as eutectic gallium-indium (EGain) or graphene. With such a configuration, a soft conductive coil 18 is formed within each cylinder 12, 14. Notably, the small diameter of the microchannels enables the creation of a highly dense electrically conductive coil 18 that can generate high-intensity magnetic fields and forces. In some embodiments, the microchannels have a cross-sectional diameter of approximately 100 to 200 μm. It is also noted that, instead of a microchannel formed in the outer cylinder 12, 14, a soft microtube can be used. As an example, the microtube can also be made of PDMS impregnated with ferromagnetic powder.

In some embodiments, the inner shaft 16 comprises a further hollow cylinder 20 that is also made of a soft, flexible polymeric material that comprises a ferromagnetic material, such as PDMS, that is impregnated with ferromagnetic powder. The cylinder 20 surrounds an inner ferromagnetic core 22. In some embodiments, the core 22 comprises a mass of ferromagnetic powder that is contained within the cylinder 20. During fabrication of the inner shaft 16, the core 22 is exposed to an intense external magnetic field (e.g., using powerful permanent magnets) so as to align the magnetic particles of the ferromagnetic powder within the core to create a powerful permanent magnet. Accordingly, the core 22 can be referred to as a permanent magnet 22a.

Joining the outer cylinders 12, 14 is a spring linkage 24. In the illustrated embodiment, the linkage 24 is configured as a cylindrical bellows that can be linearly compressed and expanded along its longitudinal axis. The linkage 24 can also be made of a soft, flexible polymeric material that also comprises a ferromagnetic material, such as PDMS that is impregnated with ferromagnetic powder.

Finally, provided between the outer cylinders 12, 14, as well as the spring linkage 24, and the inner shaft 16 is a ferromagnetic fluid 31 that provides lubrication between the cylinders and the shaft to facilitate their relative linear motion, as well as to provide heat dissipation.

With reference to FIG. 1B, the electromagnetic soft actuator 10 can be activated by applying an electrical current to the conductive coils 18 of the outer cylinders 12, 14 with a power source, such as one or more on-board batteries 32. When such an electrical current is applied, the outer cylinders 12, 14 behave as antagonistic solenoids that induce antagonistic electromagnetic fields. Depending upon the "winding" directions of the coils 18 and the current direction, repulsive or attractive forces can be generated between the outer cylinders 12, 14 that cause the cylinders to either move away from or toward each other. When the current is removed, however, the outer cylinders 12, 14 return to their original positions under the force applied by the spring linkage 24, which returns to its original shape when the repulsive or attractive force is removed. As the electromagnet soft actuator 10 is soft, it may be preferable to configure the actuator such that it only generates attractive forces that cause the actuator to contract in similar manner to mammalian muscle fibers.

Figure 2A:
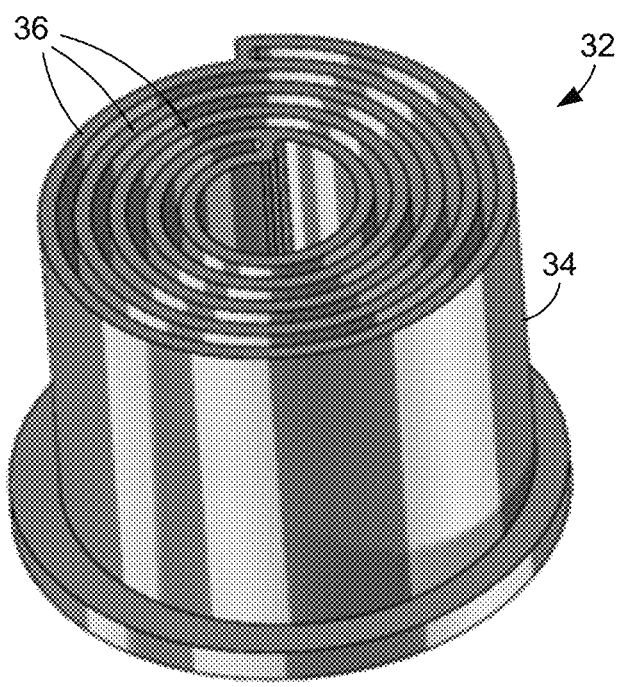
FIG. 2A is a perspective view of an alternative coil that can be used in an electromagnetic soft actuator such as that illustrated in FIGS. 1A-1C.
Figure 2B:
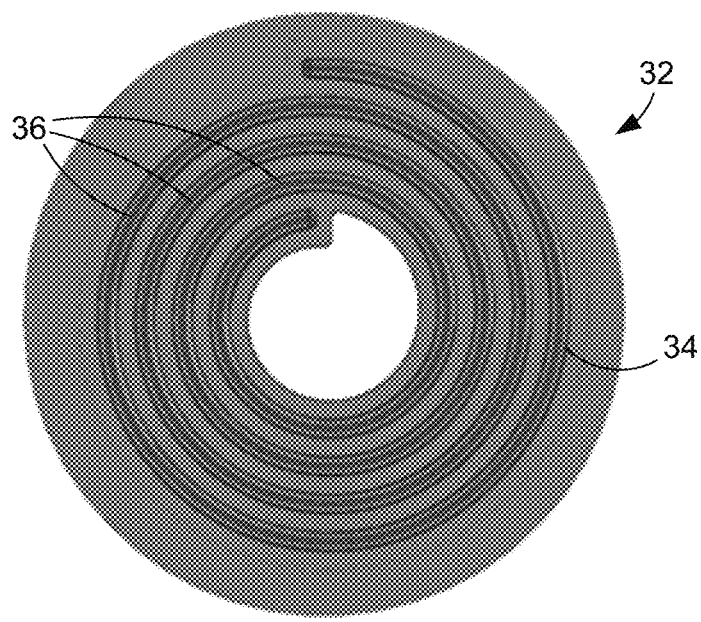
FIG. 2B is a top view of the coil of FIG. 2A.

The electrically conductive coils 18 of the outer cylinders 12, 14 can have other configurations. For example, instead of comprising a continuous helical microchannel or microtube, the coil can comprise continuous cylindrical spiral void that is filled with the electrically conductive fluid. FIGS. 2A and 2B illustrate an embodiment of such an electrically conductive coil 32. As shown in these figures, the coil 32 comprises a continuous cylindrical spiral void 34 that, when filled with electrically conductive fluid, forms a continuous cylindrical spiral coil. The intensity of the magnetic field generated by the coil 32 predictably increases with an increasing number of layers 36 of the spiral. As with the microchannels, the void 34 can be formed within the outer cylinder 12 or 14 during its production. Alternatively, the void 34 can be formed by a soft, flexible container (e.g., made of PDMS impregnated with a ferromagnetic powder) that is encapsulated within the outer cylinder 12 or 14.

It is also noted that the inner shaft 16 can also have an alternative configuration. In some embodiments, the inner shaft can comprise multiple circular members punched from a magnetic rubber sheet that are stacked together to form an elongated cylindrical shaft. Each circular member has a north magnetic pole and a south magnetic pole at its opposite faces. By stacking the members together with the same polarity directions, the members attract each other and form a magnetic core required for operation of the electromagnetic soft actuator.

Figure 3:
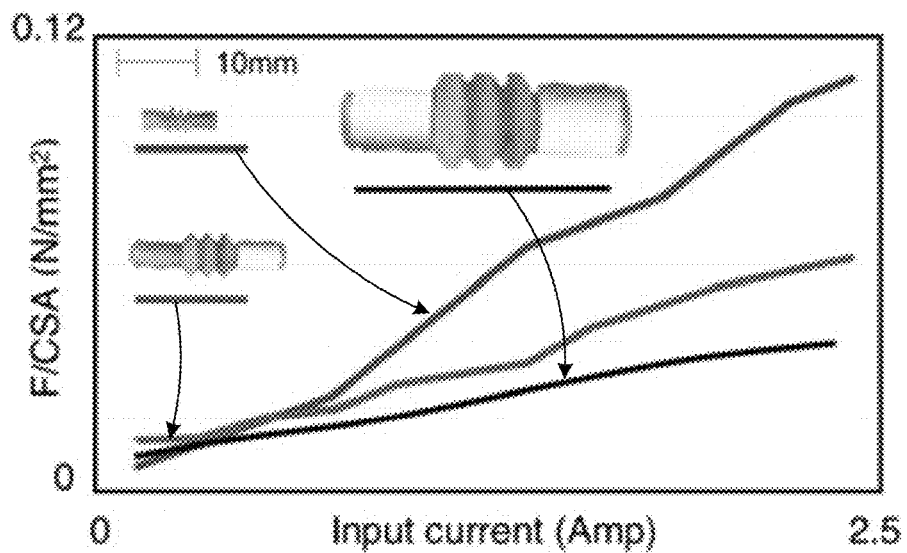
FIG. 3 is a graph that illustrates a scaling effect on the force to cross-sectional area (F/CSA) of electromagnetic soft actuators.

Prototype electromagnetic soft actuators were fabricated for evaluation purposes. The electromagnetic soft actuators had configurations similar to that shown in FIG. 1, but the conductive coils were formed from metallic wires instead of electrically conductive fluid for convenience of fabrication. Three prototype electromagnetic soft actuators were created having different sizes and their output forces as a function of input current were measured. As shown in FIG. 3, the output force per cross-sectional area of the electromagnetic soft actuator (F/CSA) increased by reducing the size of electromagnetic soft actuator. In view of this principle, it may be desirable to use the smallest feasible electromagnetic soft actuators as building blocks to develop artificial sacromeres and exofibers in order to achieve the optimum efficiency in terms of output force per unit volume.

Figure 4A:
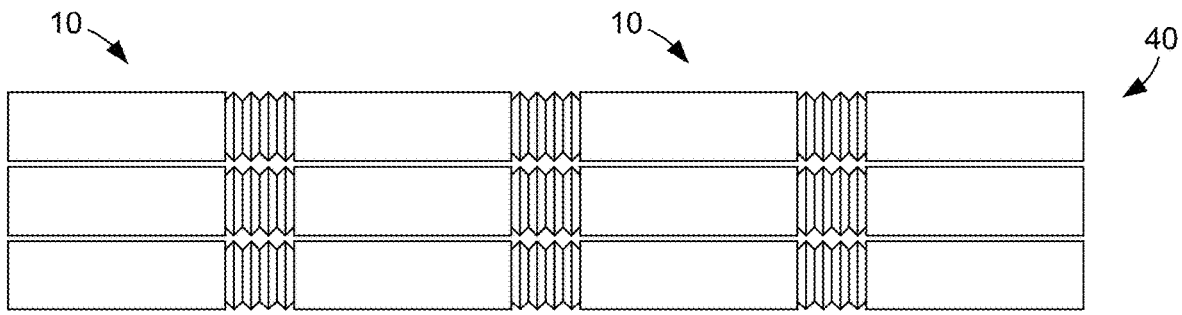
FIG. 4A is a side view of an artificial sarcomere comprised of multiple electromagnetic soft actuators.
Figure 4B:
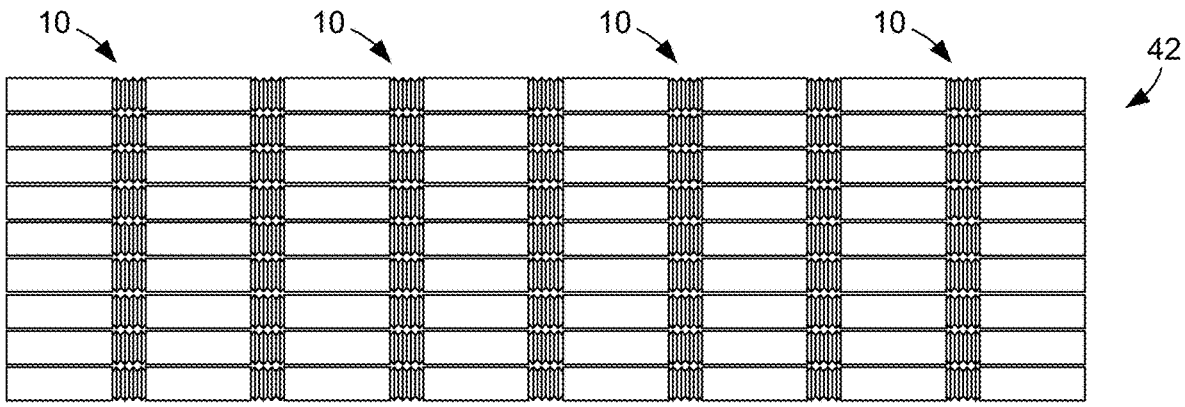
FIG. 4B is a side view of exofibers comprised of multiple artificial sarcomeres.

The hierarchical design of the disclosed exofibers was inspired by the configuration of human skeletal muscles. Muscle fibers are divided into segments called sarcomeres. Each sarcomere is composed of a collection of actin and myosin filaments that act like linear actuators. Notably, skeletal muscles can exhibit a variety of output performance by utilizing different arrangements of muscle fibers. Following such design principles, multiple electromagnetic soft actuators 10 can be connected in parallel and series to form an artificial sarcomere 40, as shown in FIG. 4A. In turn, multiple artificial sarcomeres can be subsequently connected in series to form exofibers 42, as shown in FIG. 4A.

In artificial sarcomeres, the number of parallel electromagnetic soft actuators r defines the output force, while the number of series electromagnetic soft actuators c defines the overall contraction of the artificial sarcomere. The overall stiffness of an artificial sarcomere will be the stiffness of a single electromagnetic soft actuator multiplied by a factor of r/c. Meanwhile, since the overall mass of an artificial sarcomere will be (rxc) of mass of a single electromagnetic soft actuator, the overall bandwidth of artificial muscle will be less than a single electromagnetic soft actuator. The challenge, however, lies in determining the optimal number of parallel and series electromagnetic soft actuators inside an artificial sarcomere and the current injections for each sarcomere.

The overall output force of one exofiber is equal to the output force of each artificial sarcomere due to the series connection of the sarcomeres. Meanwhile, the overall contraction of an exofiber is the sum of overall contractions of each artificial sarcomere. Since artificial sarcomeres are the actuation units of the exofibers, the resolution of exofiber motion will be the same as that of a single artificial sarcomere. The number of artificial sarcomeres inside an exofiber depends on the length of exofiber, which also depends on the arrangements of exofibers inside an assistive device. In order to determine the optimal values for r and c, the number of artificial sarcomeres, and the arrangement of exofibers, a target performance for the active joint should be considered and essential criteria, such as torque, motion trajectory, required resolution, stiffness, and bandwidth should be extracted. In addition, systematic numerical and geometrical optimization based on linear-scaling density-functional theory and topology optimization of linear elastic straps, can be applied to determine the design parameters.

Figure 5:
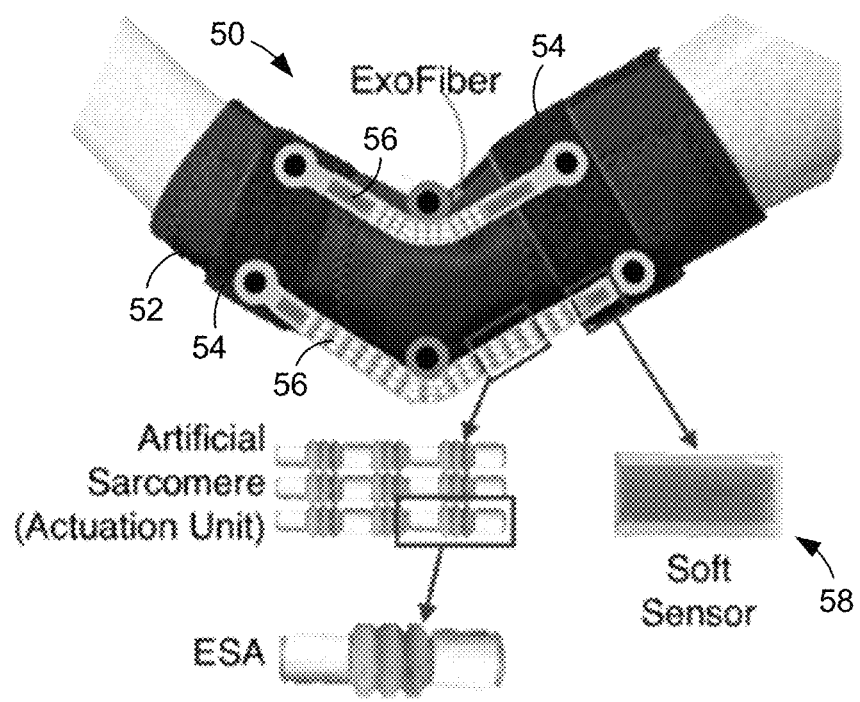
FIG. 5 is a diagram showing an assistive device, in the form of an active joint brace, that comprises exofibers of the type shown in FIG. 4B to assist a user in performing a physical task.

Fabricated exofibers can be placed inside an assistive device, such as an active joint brace, to assist a human joint. FIG. 5 shows an example of this in the form of an active elbow brace 50. As shown in the figure, the brace 50 generally comprises a limb sleeve 52, one or more straps 54 adapted to wrap around the limb, and one or more exofibers 56 that are attached to the sleeve and or straps that assist the user in bending the elbow joint. While an active elbow brace 50 has been identified as an example, it is noted that the exofibers disclosed herein can be applied to other joints and used in other active joint braces.

For the elbow joint, one may consider three scenarios: (1) following a certain motion trajectory from maximum joint extension under a no-load condition, moving to maximum flexion, and then going back to maximum extension within a certain time, (2) an isometric load handling capacity, i.e., setting the joint at different angle while certain load is applied, and (3) following a certain motion trajectory while carrying a certain load. The performance criteria for each scenario can be extracted in terms of joint torque, velocity, deflection range, and stiffness.

Notably, by creating longitudinal microchannels or microtubes inside a tendon of an active joint brace and injecting a ferromagnetic fluid into the microchannels/microtubes, one can create soft force sensors, such as sensor 58, which are capable of measuring the output force of the exofibers. As the tendon stretches, the length and diameter of the microchannels/microtubes will change, which consequently changes the resistance of the microchannels/microtubes. By measuring this change in the resistance, one is able to calculate the output force.

As mentioned above, the electromagnetic soft actuators are primarily composed of two antagonistic solenoids. Inside the outer cylinders (i.e., the two solenoids), there are conductive loops arranged to create multiple coil layers each having multiple winding loops. Assuming $N_L$ to be the number of coil layers and $N_C$ the number of winding loops in each layer, each loop can be represented by indices i and j, where i denotes the layer number of the loop ($i \in [1, N_L]$) and j indicates the loop inside its layer ($j \in [1, N_C]$).

By determining the structure of the solenoids and the arrangements of the conductive coils inside them, one is able to drive the force equation. To do so, one must first derive the electromagnetic force between two conductive loops and then expand that to calculate the electromagnetic force between the two solenoids. Using the filament method, the electromagnetic force as a result of interacting magnetic fields of two loops ij and mn, $F_{ij\text{-}mn}$ are assumed to be coaxial and are derived from the general expression for their mutual inductance at time t as:

$$F_{ij\text{-}mn}(t) = I^2(t) \frac{\delta M_{ij\text{-}mn}}{\delta Z_{Qi_{j\text{-}mn}}} \quad (1)$$

where I(t) is the time-varying input current injected into each loop, M(t) is their mutual inductance, and $Z_{Qij\text{-}mn}(t)$ is the distance between the two loops.

Figure 6:
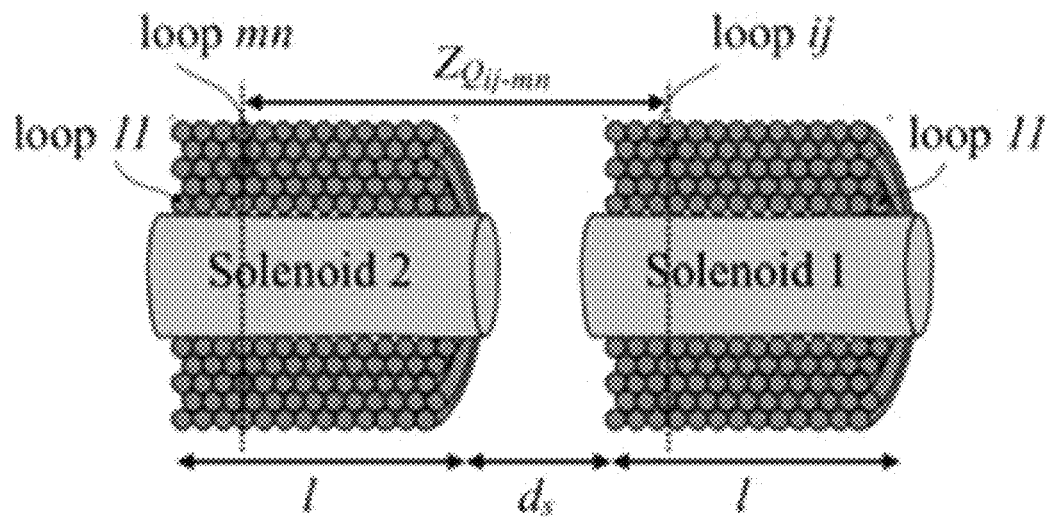
FIG. 6 is diagram analogizing the outer cylinders of the electromagnetic soft actuator to two antagonistic solenoids.

Applying Equation (1), the magnetic force of two coaxial circular conductive loops in two antagonistic solenoids, with applied current I(t) as shown in FIG. 6, is given by: $F_{ij\text{-}mn}(t) = f(I, R_{ij}, R_{mn}, Z_{Qij\text{-}mn})$, where F(.) is a nonlinear function of the current and the distance between the loops. The overall electromagnetic soft actuator electromagnetic force by considering the interaction between all pairs of loops is computed as $F(I,t) = \Sigma_{i=0}^{N_L} \Sigma_{j=0}^{N_C} \Sigma_{m=0}^{N_L} \Sigma_{n=0}^{N_C} F_{ij\text{-}mn}(t)$.

After deriving the force-current relationship, one finds the relationship between the current and the applied voltage as the input to the electromagnetic soft actuator. Consequently, the output electromagnetic force of electromagnetic soft actuator can be determined by the input voltage. This necessitates analyzing how this force compresses the actuator. This change in the length will happen at the spring linkage between the two solenoids with separating distance $d_s$.

Figure 7:
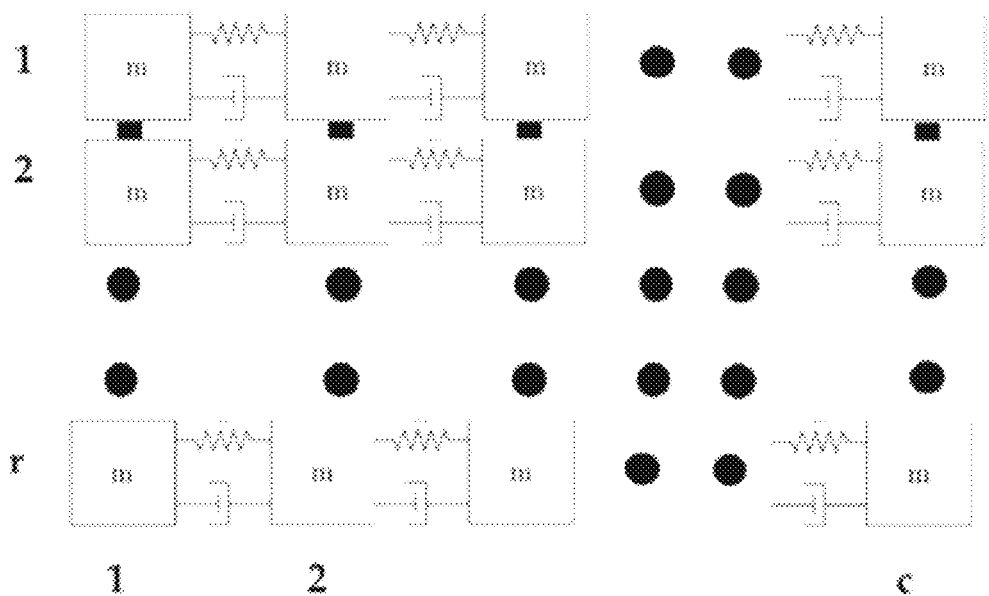
FIG. 7 is a schematic diagram illustrating a network of electromagnetic soft actuators that form an artificial sarcomere.

In a network of electromagnetic soft actuators inside an artificial sarcomere, each electromagnetic soft actuator is connected to the next actuator in series through another spring linkage and damper. FIG. 7 depicts the schematic mass-spring-damper model of an r-by-textitc matrix of mass-spring-damper networks. In each column of the matrix, the r masses of each electromagnetic soft actuator are rigidly attached (i.e., not attached through a spring and damper) to the subsequent actuators. This structure resembles the actual muscle mechanism since there are columns of myosin and actin inside a sarcomere akin to the proposed configuration.

The bio-inspired assembly of the building-block electromagnetic soft actuators is a hierarchical approach. Therefore, once the target performances of the active brace are set, one is able to determine the target performances of the exofibers for any given arrangement and then those of each artificial sarcomere. For purposes of validation, experimental platforms can be constructed to test the performance at three levels: single exofiber, active brace, and with a human elbow. The output performance can be defined in terms of: (1) contraction length, output force, linear stiffness, and bandwidth for the exofiber; (2) flexion range, torque, angular stiffness, and bandwidth for the active brace; and (3) flexion range and comfort and ease of use with a human elbow.

The length of the prototype exofiber samples was 20 cm, which is large enough for the purpose of measurement. The width and thickness, however, depend on the smallest feasible size one can print electromagnetic soft actuator and the number of electromagnetic soft actuators that compose the artificial sarcomere. The experimental test bed had two parts: an exofiber sample test and an active joint brace test. The exofiber part comprised a base that has three holder columns in a row. The two extreme holders were stationary. The middle holder, however, could frictionlessly move between the two stationary holders. The movable holder was very light and had minimal inertia.

In future experiments, a one-degree-of-freedom model of a human elbow joint will be printed (using a three-dimensional scanner from a CAD file of a human arm). The active joint brace will be placed on the arm model, while a holding frame connects each part of the arm to a load cell and a rotary encoder. The outputs of sensors (strain gauge, load cell, linear, and rotary encoders) will be fed into a data acquisition (DAQ) system with embedded A/D and D/A converter circuits. The digital measurement data will then be fed to a desktop computer. The computer will determine the input current and transmit it to the micro controller, given the data regarding the parameters used in the exofiber sample and the active brace. The micro controller will then transmit control commands to the artificial sarcomeres.

A predictive control method will be used to estimate the states of the exofiber and electromagnetic soft actuators for each timestep. To that end, how soft sensors can be utilized to obtain some of the states will be investigated. The remaining states can be estimated through a robust Kalman filter. In particular, the proposed electromagnetic soft actuator can also be facilitated with an embedded soft sensor. A tiny longitudinal strap made of PDMS can be printed in at the two ends of an exofiber with embedded microchannels or microtubes. By injecting the conductive fluid inside the microchannel/microtube, a soft sensor can be easily fabricated. However, this soft sensor only works when it experiences an extension. The extension in the length of the microchannel/microtube will lead to a reduction in the cross-section area (the overall volume is constant). These changes in the length and cross-sectional area will lead to an increase in the resistance of the conductive liquid inside the microchannel/microtube.

By measuring the changes in the resistance, and knowing the material properties of the PDMS strap such as the stiffness, one can identify the magnitude of the extension force applied to the strap. By knowing the material properties of the electromagnetic soft actuator, one can calculate the overall applied force. Another important function of the soft sensors is stiffness regulation. Soft sensors will be designed in such a way that a non-linear force to deflection profile is achieved. This non-linearity is crucial for stiffness regulation (as by changing the pre-deflection one can regulate the stiffness). Therefore, the soft sensors attached to each end of the exofibers also play the role of tendons in the human body.

While it may not be possible for the soft sensors to be installed throughout each electromagnetic soft actuator, the dynamic system is in fact observable even with only a few sensors. This implies that that the remaining (unmeasured) states can be estimated using a robust Kalman filter or a sliding mode observer for systems with disturbances and unknown inputs. Note that such a state estimator, like any state estimator, is simply a computer program that estimates the states of the exofiber. Hence, additional hardware is not needed. Once the state of the system is estimated, the predictive controller will use the estimated state to improve the performance of the active brace. With such a system, one can measure the output force, contraction range (passive and active), stiffness, and frequency operation of the exofiber sample, as well as the torque capacity, flexion range, joint stiffness, and bandwidth of the active joint.

A small-scale pilot study can also be conducted in two cohorts of adults: healthy individuals and subjects with following conditions: elbow weakness, decreased range of motion, and stiffness due to stroke. Data from these two cohorts will reveal the target dynamic performance for the active brace that can potentially help after-stroke patients to achieve the same level of performance of healthy adults. These data will allow for tuning and validation of electromagnetic soft actuator characteristics and cumulative exofiber orientation. To this end, the healthy adult will be asked to perform three types of exercises: (1) to hold his or her arm at 5 different flexion-extension stationary angles while suddenly perturbed by a 2 Nm torque, (2) to flex and extend his or her arm while holding a 2 kg weight at two different speeds (slow and normal), and (3) to flex his or her arm while working against a constant torque of 2 Nm. The motion of the arm will be measured using a motion capture system while the biceps and triceps muscle activation is measured using electromyography (EMG) signals. This set of experiments will provide insight about the elbow stiffness at different angles as well as torque and angular velocity of the elbow joint for healthy adults.

By comparing the two sets of data from healthy and after-stroke patients, the maximum torque, stiffness, and angular deflection that should be provided by the active brace can be determined. The idea is that an after-stroke patient should be able to achieve the same level of dynamic performance as for a healthy adult using the active brace. This will set the target performance for the active brace.

Assuming that the exofibers can only apply puling forces similar to human muscles, they must be arranged based on agnostic-antagonistic fashion. The number of exofibers at agnostic and antagonistic sides, as well as their attachment points, can be determined based on the dynamic properties of each exofiber. Through simulation, force, velocity, and stiffness characteristics of the active brace will be determined based on different antagonistic arrangements of exofiber around the elbow joint. The result will be compared to the target performance values obtained through aforementioned experiments.

Based on the simulation result, the exofibers can then be arranged in an elbow brace and applied to the three-dimensional printed one degree-of-freedom human arm model. Using the experimental setup described above, the performance of the active brace can be evaluated. The torque will be measured by a torque sensor attached to the model, while the velocity and position will be tracked with a motion capture system.

A perturbation experiment will also be used to determine the elbow joint stiffness at certain angles. Through statistical analysis, it will be shown how closely one can achieve the target performance and the potential of the active brace to be used as a rehabilitation/assistive system for the elbow joint will be determined.

Figures 8A, 8B:
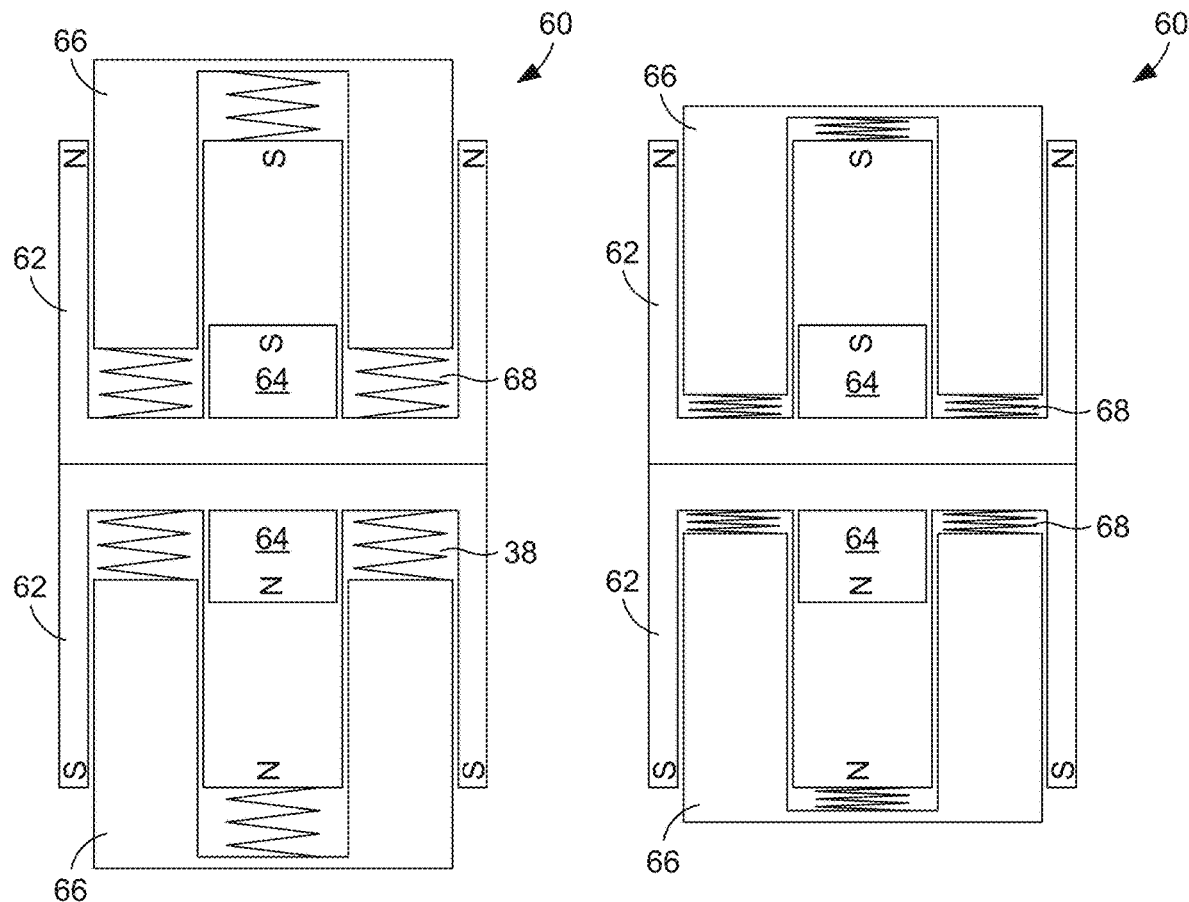
FIGS. 8A and 8B are diagrams of an embodiment of an alternative electromagnetic soft actuator illustrating the actuator in an inactivated state (8A) and an activated state (8B), respectively.

FIGS. 8A and 8B illustrate a further embodiment of an electromagnetic soft actuator 60 that is based on the working principle of a voice coil motor. As shown in these figures, the electromagnetic soft actuator 60 comprises two opposed magnet holders 62 that together form an H-shaped cross-section. Each magnet holder 62 supports a permanent magnet 64. The magnet holders 62 can also be made of a soft, flexible polymeric material that comprises a ferromagnetic material, such as PDMS that is impregnated with ferromagnetic powder. In some embodiments, the permanent magnets 64 can be fixedly secured to the holders 62 using an adhesive.

With further reference to FIGS. 8A and 8B, the electromagnetic soft actuator 60 also includes opposed armatures 66 that are received by the magnet holders 62. Like the magnet holders 62, the armatures 66 can also be made of a soft, flexible polymeric material that comprises a ferromagnetic material, such as PDMS that is impregnated with ferromagnetic powder. Formed within each armature 66 is an internal electrically conductive coil (not shown). The coils can comprise microchannels or microtubes formed within the magnet holders 62 during their fabrication (e.g., using an additive manufacturing process) or continuous spirals that are filled with an electrically conductive fluid, such as EGain or graphene. The armatures 66 are connected to the magnet holders 62 with spring elements 68 that, like the spring linkage 24, return the electromagnetic soft actuator 60 back to its initial position after actuation.

When electric current is applied to the coils of the armatures 66, it creates an electromagnetic force inside the magnetic field created by the permanent magnets 64.

The direction of the force depends on the direction of the current. Therefore, the electromagnetic soft actuator 60 can be used in a repulsion or attraction scenario.

However, due to the softness of the actuator 60, it may be preferable only use the actuator in the attraction (contraction) scenario. FIG. 8A shows an initial orientation of the actuator 60, while FIG. 8B shows an activated orientation of the actuator that occurs after a current has been applied to the coils of the armatures 66. The forces that can be generated by this type of soft actuator can be larger than those of the solenoid-type soft actuator described above. Accordingly, the voice coil motor actuator may be more suitable for leg and arm joints, while the solenoid actuator may be more suitable for neck and hand motion assistance.

The present disclosure describes various embodiments of electromagnetic soft actuators that can be assembled to create artificial sarcomeres, which can be assembled to create exofibers that can be integrated into assistive devices, such as active joint braces. While the present disclosure has focused on using electromagnetic soft actuators to assist human beings, persons having ordinary skill in the art will appreciate that such actuators could be used to other animals. Moreover, it is noted that the electromagnetic soft actuators can be used in other applications besides assisting a human or animal. Accordingly, this disclosure is not intended to limit the application of the disclosed electromagnetic soft actuators in any way.

The invention claimed is:

1. An electromagnetic soft actuator comprising:
   a first soft outer member comprising a soft internal electrically conductive coil;
   a second soft outer member comprising a soft internal electrically conductive coil;
   a soft inner shaft on which the first and second soft outer members are mounted, the first and second soft outer members being linearly displaceable along a length of the soft inner shaft, the soft inner shaft comprising a permanent magnet; and
   a spring linkage surrounding the soft inner shaft that connects the first and second soft outer members, the spring linkage being capable of linearly compressing and expanding:
   wherein the first and second outer members linearly move under an electromagnetic force relative to the soft inner shaft and each other when an electric current is applied to the soft internal electrically conductive coils.

2. The actuator of claim 1, wherein the first and second soft outer members are made of a flexible polymeric material that comprises a ferromagnetic material.

3. The actuator of claim 1, wherein the first and second soft outer members are made of polydimethylsiloxame (PDMS) that is impregnated with ferromagnetic powder.

4. The actuator of claim 1, wherein the soft internal electrically conductive coil comprises a continuous microchannel or microtube configured as a multilayer helix that forms the shape of the coil and is filled with an electrically conductive fluid.

5. The actuator of claim 1, wherein the soft internal electrically conductive coil comprises a continuous cylindrical spiral void that that forms the shape of the coil and is filled with an electrically conductive fluid.

6. The actuator of claim 1, wherein the soft inner shaft comprises a hollow cylinder having an inner ferromagnetic core.

7. The actuator of claim 6, wherein the hollow cylinder is made of a flexible polymeric material that comprises a ferromagnetic material and wherein the hollow cylinder is filled with a ferromagnetic material that forms the permanent magnet.

8. The actuator of claim 6, wherein the hollow cylinder is made of polydimethylsiloxame (PDMS) that is impregnated with ferromagnetic powder and wherein the hollow cylinder is filled with ferromagnetic powder that forms the permanent magnet.

9. The actuator of claim 1, wherein the spring linkage comprises a cylindrical bellows.

10. The actuator of claim 1, wherein the spring linkage is made of a flexible polymeric material that comprises a ferromagnetic material.

11. The actuator of claim 1, wherein the spring linkage is made of polydimethylsiloxame (PDMS) that is impregnated with ferromagnetic powder.

12. The actuator of claim 1, further comprising ferromagnetic fluid provided between the soft outer members and the soft inner shaft.

13. The actuator of claim 1, wherein the first and second soft outer members and the soft inner shaft are each cylindrical.

14. An exofiber comprising:
multiple electromagnetic soft actuators arranged in series and in parallel, each electromagnetic soft actuator including:
- a first soft outer member comprising a soft internal electrically conductive coil,
- a second soft outer member comprising a soft internal electrically conductive coil,
- a soft inner shaft on which the first and second soft outer members are mounted, the first and second soft outer members being linearly displaceable along a length of the soft inner shaft, the soft inner shaft comprising a permanent magnet, wherein the first and second outer members linearly move under an electromagnetic force relative to the soft inner shaft and each other when an electric current is applied to the soft internal electrically conductive coils; and
- a spring linkage surrounding the soft inner shaft that connects the first and second soft outer members, the spring linkage being capable of linearly compressing and expanding.

15. The exofiber of claim 14, wherein the soft internal electrically conductive coil comprises a continuous microchannel or microtube configured as a multilayer helix that forms the shape of the coil and is filled with an electrically conductive fluid.

16. An assistive device comprising:
an exofiber comprising multiple electromagnetic soft actuators arranged in series and in parallel, each electromagnetic soft actuator including:
- a first soft outer member comprising a soft internal electrically conductive coil,
- a second soft outer member comprising a soft internal electrically conductive coil,
- a soft inner shaft on which the first and second soft outer members are mounted, the first and second soft outer members being linearly displaceable along a length of the soft inner shaft, the soft inner shaft comprising a permanent magnet, wherein the first and second outer members linearly move under an electromagnetic force relative to the soft inner shaft and each other when an electric current is applied to the soft internal electrically conductive coils; and
- a spring linkage surrounding the soft inner shaft that connects the first and second soft outer members, the spring linkage being capable of linearly compressing and expanding.

17. The assistive device of claim 16, wherein the assistive device is an active joint brace.

18. The assistive device of claim 17, further comprising first and second straps that are configured to wrap around a user's limb adjacent to a joint to be assisted, wherein the exofiber is connected to both straps.

19. The assistive device of claim 18, further comprising a power source configured to supply electric current to the soft internal electrically conductive coils of the first and second soft outer members.

20. The assistive device of claim 19, further comprising a sleeve configured to wrap around the user's limb, the sleeve supporting the straps and the power source.

* * * * *